United States Patent
Weiss

(10) Patent No.: US 6,665,801 B1
(45) Date of Patent: Dec. 16, 2003

(54) METHOD AND APPARATUS FOR CHARGING A SELF POWERED USB DEVICE AT DIFFERENT CHARGE RATES ACCORDING TO THE CHARGE LEVEL OF A RECHARGEABLE ELEMENT ON THE DEVICE

(75) Inventor: Martin M. Weiss, The Woodlands, TX (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/492,468

(22) Filed: Jan. 27, 2000

(51) Int. Cl.[7] ................................................. G06F 1/26
(52) U.S. Cl. ........................ 713/300; 713/310; 713/340
(58) Field of Search ................................. 320/116, 125, 320/135, 136, 149, 159, 164; 709/202; 429/300; 713/300, 310, 320, 340

(56) References Cited

U.S. PATENT DOCUMENTS

| | | | | |
|---|---|---|---|---|
| 4,243,929 A | * | 1/1981 | Lenart | 320/164 |
| 4,742,290 A | * | 5/1988 | Sutphin et al. | 320/149 |
| 5,179,335 A | * | 1/1993 | Nor | 320/159 |
| 5,396,163 A | * | 3/1995 | Nor et al. | 320/159 |
| 5,510,693 A | | 4/1996 | Theobald | 320/24 |
| 5,539,298 A | | 7/1996 | Perkins et al. | 320/21 |
| 5,675,813 A | | 10/1997 | Holmdahl | 395/750 |
| 5,786,682 A | * | 7/1998 | Aiken et al. | 307/66 |
| 5,799,196 A | | 8/1998 | Flannery | 395/750.03 |
| 5,914,877 A | | 6/1999 | Gulick | 364/400.01 |
| 6,119,194 A | * | 9/2000 | Miranda et al. | 710/306 |
| 6,128,743 A | * | 10/2000 | Rothenbaum | 710/100 |
| 6,329,789 B1 | * | 12/2001 | Gavrilov et al. | 310/128 |
| 6,351,100 B1 | * | 2/2002 | Altham | 307/149 |
| 6,357,011 B2 | * | 3/2002 | Gilbert | 713/300 |

* cited by examiner

Primary Examiner—Thomas Lee
Assistant Examiner—Paul Yanchus, III
(74) Attorney, Agent, or Firm—Amin & Turocy, LLP

(57) ABSTRACT

A Universal Serial Bus (USB) remote hub or function device is provided that includes a large energy well (e.g. rechargeable device such as a battery or large capacitor) for providing the required power to peripherals when the peripheral device requires more power than the USB allows. The large energy well or rechargeable device shall charge using current drawn from the USB bus and terminate charge by the controller or discrete circuitry provided on the remote hub or function. The rechargeable device shall draw current from the USB at a maximum of 100 ma during power up and may enter a high power bus powered mode, so that it can draw the maximum 500 ma of current provided by the USB. The rechargeable device will turn off or draw a sleep current of less than 500 pa when the USB is placed in a suspend state. The device may optionally be configured to provide remote wake up functionality to provided support to the USB power management to allow recharging to resume.

36 Claims, 6 Drawing Sheets

METHOD AND APPARATUS FOR CHARGING A SELF POWERED USB DEVICE AT DIFFERENT CHARGE RATES ACCORDING TO THE CHARGE LEVEL OF A RECHARGEABLE ELEMENT ON THE DEVICE

TECHNICAL FIELD

The present invention relates to a Universal Serial Bus device and more particularly to a Universal Serial Bus device that includes a rechargeable unit that recharges through the Universal Serial Bus.

BACKGROUND OF THE INVENTION

The Universal Serial Bus (USB) specification is a proposed standard recently promulgated by a group of computer companies including Compaq Computer Corporation, Digital Equipment Corporation, IBM, Intel Corporation, Microsoft Corporation and Northern Telecom. Described below are various aspects of the Universal Serial Bus. The Universal Serial Bus is intended as a bi-directional, isochronous, low-cost, dynamically attachable, serial interface to promote easy PC peripheral expansion and provide full support for real-time voice, audio, and compressed video data. The Universal Serial Bus provides two-wire point-to-point signaling in which the signals are differentially driven at a bit rate of 12 megabits per second. The Universal Serial Bus includes support for both isochronous and asynchronous messaging at the 12 megabit per second data speed.

The USB specification introduces a new type of bus structure to replace the existing serial peripheral bus. The USB standard specifies USB devices known as "hubs" that provide attachment points for other USB devices, such as USB-compliant peripherals (called "functions"). Hubs are of three basic types: bus-powered and self-powered. Bus-powered hubs draw all their power from their USB connection, while self-powered hubs draw power from an exteral power source, or a hybrid of both the external power source and the USB. Bus-powered and self-powered hubs both provide power to devices attached to them. However, a bus-powered hub can only redistribute the amount of power it receives from its connection to the USB, and each downstream port on a bus-powered hub can supply a maximum of 100 mA to its attached device. A self-powered hub should be able to supply up to 500 mA to each downstream device attached to the hub.

Functions are likewise divided into bus-powered and self-powered classes, with bus-powered functions further categorized as low-power and high-power. Low-power functions can be powered from either type of hub, but high-power functions should be connected to self-powered hubs in order to have sufficient power to operate. Low-power functions are generally peripherals such as a mouse or a keyboard; high-power functions include printers and speakers. Self-powered functions can be attached to either type of hub as the function does not draw its operating power from the hub, although it can draw minimal power from the USB to support itself when in a suspended state. USB hubs and functions generally enter a minimal power "suspend" state when they detect no I/O activity on their USB connections for a certain period of time. During normal operations, each hub is responsible for passing on a polling signal from the USB host to the devices attached to the hub to prevent the hubs from suspending. Suspended hubs typically cannot transfer data on the bus until enabled by a "resume" command.

In some situations, an individual using a computer may need to utilize a high powered peripheral device that draws current higher than that permitted by the USB specification, such as a zip drive or a wide area network radio, when the individual does not have access to an external power source. These type of peripherals generally have very high peak continuous current demands that when averaged over hours draw very little current. For example, if the individual is on an airplane he/she may desire to store work on the zip drive. Although the zip drive only will be used for a short period of time and has a low average current draw over time, it draws a great deal of power during powering up, which cannot be made available by a USB powered device due to the strict power constraints of the USB bus power rules. Therefore, it would be necessary to provide a device with a battery that can provide large amounts of current for a short period of time. Such a device would be impractical because the battery in the device would have to be either very large or it would discharge so rapidly that it would continually need to be replaced. If the battery were a rechargeable device it would have to be continuously recharged by an external recharging device. If an external recharging device was available, then it would not be necessary to utilize a battery to provide a self powered device in the first place.

Accordingly, there is a strong need in the art for a device that can provide the necessary short term power to the high powered peripherals as described above, and that can be reused, while still adhering to the strict power requirements of the USB specification.

SUMMARY OF THE INVENTION

According to a preferred embodiment of the present invention, a function device or USB remote hub is provided that includes a large energy well (e.g. rechargeable device such as a battery or large capacitor) for providing the required power to peripherals when the peripheral device requires more power than the USB allows. The large energy well or rechargeable device shall charge using current drawn from the USB bus and terminate charge by the controller or discrete circuitry provided on the function or remote hub. The rechargeable device shall draw current from the USB at a maximum of 100 ma during power up and then may enter a high power bus powered mode, so that it can draw the maximum 500 ma of current provided by the USB. The rechargeable device will turn off or draw a sleep current of less than 500 $\mu$a when the USB is placed in a suspend state. The device may optionally be configured to provide remote wake up functionality to provided support to the USB power management to allow recharging to resume.

Thus, according to one aspect of the present invention, a remote function device is provided coupleable to a host computer through a Universal Serial Bus port. The remote function device includes a function controller coupleable to the host computer, a mode and status system coupled to the function controller and a rechargeable device coupled to the mode and status system. The rechargeable device is adapted to drive a peripheral device wherein the rechargeable device draws current from the Universal Serial Bus to charge the rechargeable device to a predetermined charge level for driving the peripheral device, the predetermined charge level exceeding a charge level that can be provided directly from the Universal Serial Bus.

In accordance with another aspect of the present invention a remote hub device is provided that is coupleable to a host computer through a Universal Serial Bus port. The remote hub device includes a hub controller coupleable to the host computer, a mode and status circuit coupled to the hub controller, and rechargeable device coupled to the mode and status circuit. The rechargeable device is adapted to provide current to at least four power ports, each port having means for limiting the current through the port, wherein the rechargeable device draws current from the Universal Serial Bus to charge the rechargeable device to a predetermined charge level for providing the current to the at least four power ports.

In accordance with yet another aspect of the present invention, a method of charging a rechargeable device on a Universal Serial Bus device coupled to a host computer is provided. The method includes the steps of initializing the Universal Serial Bus device in a low charge rate, configuring the Universal Serial Bus device to operate in a high power bus powered mode, charging the rechargeable device at a high charge rate until the rechargeable device reaches a predetermined charge level for the high charge rate, and charging the device at a low charge rate until the rechargeable device reaches a predetermined charge level for the low charge rate.

In accordance with another aspect of the present invention, a remote Universal Serial Bus device is provided that is coupleable to a host computer through a Universal Serial Bus port. The device includes means for powering a high powered peripheral device, the means for powering the high powered peripheral device being rechargeable, means for monitoring the charge level of the means for powering the high powered peripheral device, means for changing the charge level of the means for powering the high powered peripheral device, and means for controlling the configuration of the Universal Serial Bus device, which communicates to the host computer wherein the means for controlling the configuration of the Universal Serial Bus device configures the Universal Serial Bus device as a high power bus powered device after power up.

In accordance with yet another aspect of the present invention a remote function device is provided that is coupleable to a host computer through a Universal Serial Bus port. The device includes a function controller coupleable to the host computer, a mode and status circuit coupled to the function controller, and a rechargeable device coupled to the mode and status circuit. The rechargeable device is adapted to drive a high powered peripheral device wherein the rechargeable device draws more than 100 ma and less than 500 ma from the Universal Serial Bus to charge the rechargeable device to a predetermined charge level for a high charge rate, then the rechargeable device draws less than 100 ma until the rechargeable device reaches a predetermined charge level for a low charge rate, wherein the rechargeable device stops charging at the low charge rate upon reaching the predetermined charge level for the low charge rate.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

DETAILED DESCRIPTION OF THE INVENTION

Figure 1:
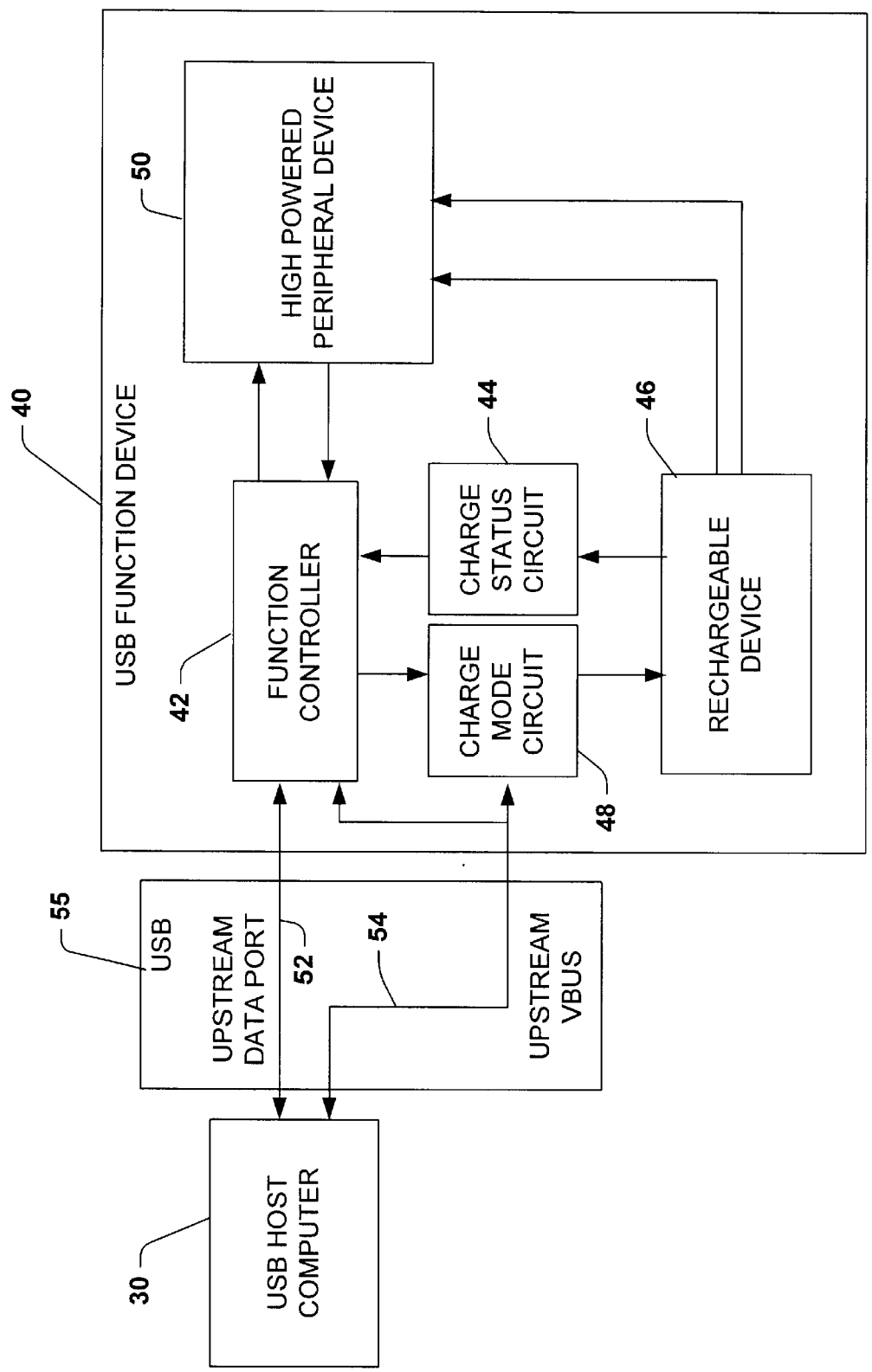
FIG. 1 illustrates a block diagram of a Universal Serial Bus function device including a recharge device coupled to a host computer in accordance with one aspect of the present invention.

The present invention will now be described with respect to the accompanying drawings in which like numbered elements represent like parts.

The Universal Serial Bus is physically configured as a "tiered star" network. At the center of each star is a USB device called a "hub" that serves as the bus connection point for other USB devices, either other hubs or "functions." Functions are generally standard computer peripherals which conform to the USB standard, or specialized circuitry designed to add certain functionality to the computer. Functions can be hardware, firmware, software, or a combination. Each hub has multiple attachment points, known as "ports," to which its functions and other hubs are connected by means of USB-specific cables. Hubs are interconnected to form a USB network containing up to 127 functions. All but the hub in the top tier (the "root" hub) can be located external to the computer cabinet and are referred to as "remote" or "downstream" hubs. The remote hubs can be stand-alone units or embedded in USB peripherals. All hubs have a number of downstream ports used to attach functions or lower tier hubs, and a single "root" port that connects the hub to a hub in the next highest tier "upstream" in the USB network structure.

The USB network is controlled by the computer and its standard operating system software in conjunction with USB system software. The root hub is embedded in the computer and its root port provides the USB's physical interface to the computer. The combination of the computer, the standard operating system, the root hub, and the USB software is called a USB "host." The USB network performs the standard functions of a communications bus by transferring data and commands from the computer's central processing unit (CPU) to the root hub which passes the information downstream to the appropriate remote hub that controls the receiving function and thence to the function itself. Signals from the function to the CPU retrace the same route in reverse, and traverse the network "upstream" to the host.

USB devices may obtain power from an external source and/or from the USB through the hub to which they are attached. Externally powered USB devices are termed self-powered. These devices may already be powered before they are attached to the USB. A device may support both self-powered and bus-powered configurations. Some device configurations support either power source. Other device configurations may only be available if the device is externally powered. Devices report their power source capability through the Configuration Descriptor. The current power source is reported as part of a device's status. Devices may change their power source at any time; e.g., from self- to USB-powered.

USB supports a range of devices as categorized by their power consumption. For example, a Bus-powered hub draws all of the power to any internal functions and downstream ports from the USB connector power pins. It may draw up to one load (A unit load is defined to be 100 mA) upon power up and a total of five loads, which is split between any embedded functions and external ports. External ports in a bus-powered hub can supply only one load per port regardless of the current drawn on the other ports of that hub. The power for a self-powered hubs and the power for the internal functions and downstream ports does not come from USB, although the USB interface may draw up to one load from its upstream connection to allow the interface to function when the remainder of the hub is powered down. The hub must supply five unit loads on all of its external downstream ports. Furthermore, in a low power, bus-powered functions, all the power to these devices comes from USB connector. They may draw no more than one unit load at any time. In a high power, bus-powered functions, the power to these devices comes from USB connector. They must draw no more than one unit load upon power up and may draw up to five unit loads after being configured. Self-powered functions may draw up to one load from their upstream connection to allow the interface to function when the remainder of the hub is powered down. All other power comes from an external (to USB) source. The hub on the host in a desktop computer is a self-powered hub. The same hub in a notebook computer can be defined to be either a self-powered or bus-powered hub. All devices, whether they are bus-powered or self-powered, can only draw (sink) current from the bus. They must not supply current upstream to a host or hub port. On power up, all devices need to insure that their upstream port is not enabled, so that the device is able to receive the reset signaling, and that the maximum operating current drawn by a device is one unit load. If a device draws power from the bus, its internal supply derived from V bus must be stable within 100 ms of V bus reaching 4.4 V. All devices which are drawing power from the bus must be able enter the suspend state and reduce their current consumption from V bus to less than 500 $\mu$A.

In a compound self powered hub, all of the power is provided to all downstream ports from the local power supply. The number of ports that can be supported is limited only by what the local supply can deliver and by safety concerns. Each port must be capable of supplying at least five unit loads. However, no single port can deliver more than 5.0 A in order to meet regulatory safety limits. Current limiting on the downstream ports may need to be partitioned into two or more port subgroups in order to deliver sufficient power to all ports without exceeding the current available through one port.

The host and all self-powered hubs must implement overcurrent protection for safety reasons, and they must have a way to detect the overcurrent condition and report it to the USB software. Should the aggregate current drawn by a group of downstream ports exceed a preset value, the overcurrent protector removes power from all downstream ports and reports the condition through the hub to host controller. The preset value cannot exceed 5.0 A and should be sufficiently above the maximum allowable port current such that power up or dynamic attach transient currents do not trip the overcurrent protector. If an overcurrent condition occurs on any port, subsequent operation of the USB is not guaranteed, and once the condition is removed, it may be necessary to reinitialize the bus as would be done upon power-up.

When a function or hub is plugged into the network, it has a certain amount of on-board capacitance between VBus and ground. In addition, the regulator on the device may supply current to its output bypass capacitance and to the function as soon as power is applied. Consequently, if no measures are taken to prevent it, there could be a surge of current into the device which might pull the VBus on the hub below its minimum operating level. Inrush currents can also occur when a high-power function is switched into its high-power mode. This problem must be solved by limiting the inrush current and by providing sufficient capacitance in each hub to prevent the power supplied to the other ports from going out of tolerance. An additional motivation for limiting inrush current is to minimize contact arcing, thereby prolonging connector contact life.

Suspend current is a function of unit load allocation. All USB devices initially default to low-power. Low-power devices or high-power devices operating at low-power are limited to 500 $\mu$A of suspend current. If the device is configured for high-power and enabled as a remote wakeup source, it may draw up to 2.5 mA during suspend. When computing suspend current, the current from VBus through the bus pull-up and pull-down resistors must be included. Configured bus-powered hubs may also consume a maximum of 2.5 mA, with 500 $\mu$A allocated to each available external port and the remainder available to the hub and its internal functions. If a hub is not configured, it is operating as a low-power device and must limit its suspend current to 500 $\mu$A.

Further background concerning the Universal Serial Bus may be obtained from the Universal Serial Bus Specification, Revision 1.1, which is hereby incorporated by reference.

The above stated requirements were considered in employing a USB function device and a remote hub device in accordance with the present invention. Referring initially to FIG. 1, a USB function device 40 is provided connected to a USB host computer 30 by an upstream data port 52 and an upstream Voltage Bus (VBus) 54 of a typical USB communication port 55. The USB function device 40 includes a function controller 42 powered by the VBus 54 and connected to the upstream data port 52. The function controller 42 communicates bidirectionally with a high powered peripheral device 50 and unidirectionally with a charge mode circuit 48 and a charge status circuit 44. The charge mode circuit 48 and the charge status circuit 44 are coupled to a rechargeable device 46, which could be a battery or a large capacitor, that acts as an energy well for storing current. The rechargeable device 46 provides power to the high powered peripheral device 50. The function controller 42 communicates with the USB host 30 to inform the USB host 30 that the USB function device 40 is ready to operate.

Preferably, the function controller 42 includes an on board memory which serves to store program code executed by the function controller 42 for carrying out operating functions of the USB function device 40 as described herein. The memory includes read only memory (ROM) and random access memory (RAM). The ROM contains among other code the Basic Input-Output System (BIOS) which controls the basic hardware operations of the USB function device 40. The RAM includes the resident program for communicating to the USB host computer 30, and controlling the overall operation of the USB function device 40. The function controller 42 could be a processor, such as the p24T, Pentium 50/75, Pentium 60/90, and Pentium 66/100, Pentium PRO and Pentium 2, and other similar and compatible processors. Preferably, the function controller is a controller, such as one chosen from the Intel MCS 96/296 or MCS 51/151/251 microcontroller families. The manner in which the function controller can be programmed to carry out the functions relating to the present invention will be readily apparent to those having ordinary skill in the art based on the description provided herein.

The USB Host computer 30 provides current via the VBus to the charge mode circuit 48, which determines the amount of current provided to the rechargeable device. The charge mode circuit 48 is controlled by the function controller 42, which also receives status information from the charge status circuit 44 informing the function controller 42 when the rechargeable device 46 has been charged to a predetermined threshold, or has fallen below a predetermined charge level for running the high powered peripheral device 50. It should be appreciated that the charge mode system 48 and/or the function controller 42 could control the charge level of the rechargeable device 46. Furthermore, it should be appreciated that recharging of the rechargeable device may be halted or may continue when the rechargeable device 46 is powering the high powered peripheral device 50.

Figure 2A:
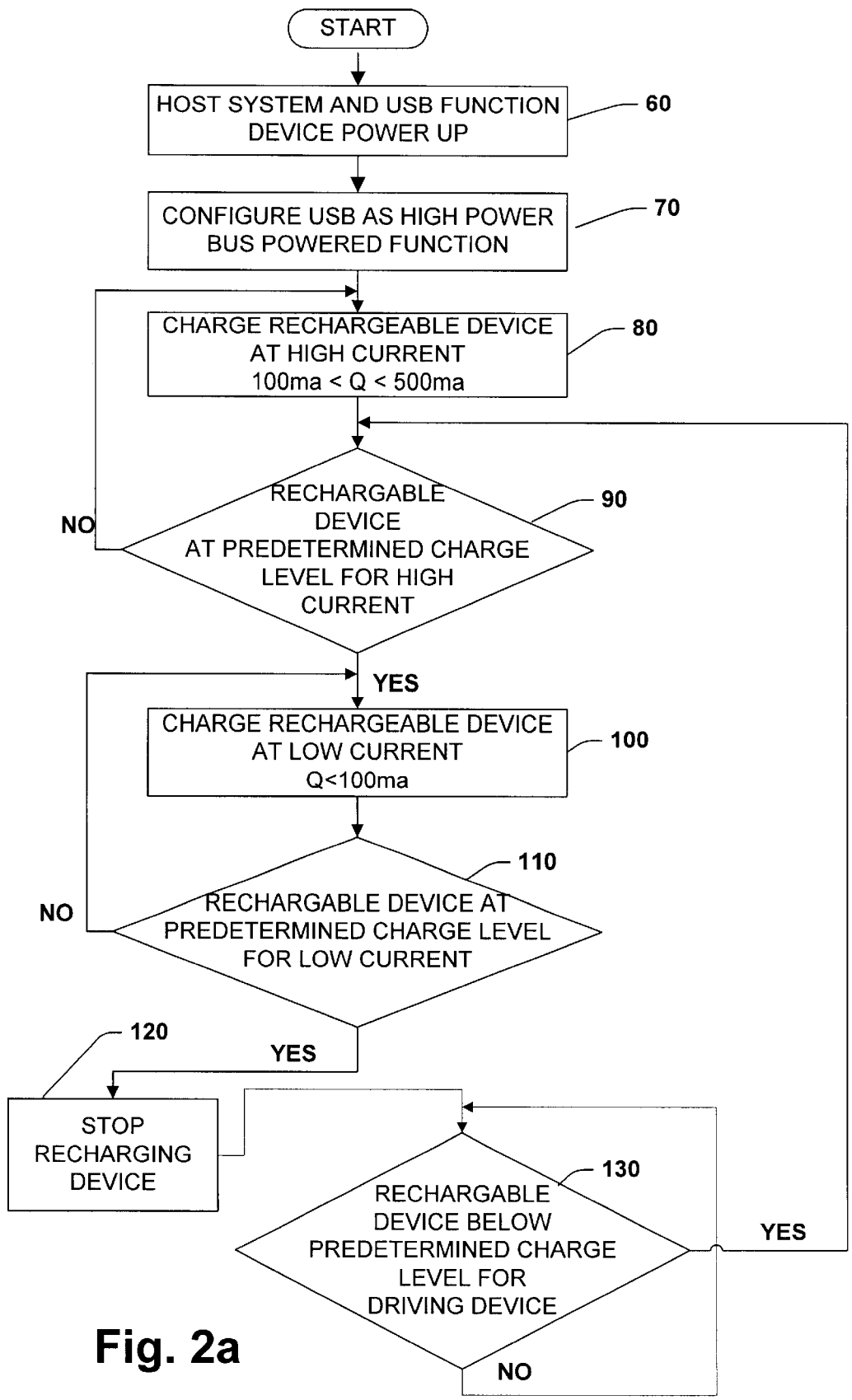
FIG. 2a illustrates a flow diagram for charging the rechargeable device of FIG. 1 in accordance with one aspect of the present invention.

FIG. 2a illustrates the steps taken by the present invention to ensure that rechargeable device 46 has appropriate charge for operating the high powered peripheral device 50. Beginning in step 60, the host system 30 and the USB function device 40 power up. The charge mode circuit 48 limits the current drawn by the USB function device 40 to less than 100 mA. The USB function 40 device then is configured as a high power bus powered function by communicating this to the host system 30 through the function controller 42, in step 70. This allows the host system 30 to provided the USB function device 40 with up to 500ma of current. The charge mode circuit 48 then allows the rechargeable device 46 to draw from 100–500 ma of current at a high charge rate in step 80. In step 90, the charge status circuit 44 monitors the rechargeable device 46 to determine if the device has met a predetermined charge level for the high charge rate. If no, step 80 and 90 are repeated until the battery reaches the predetermined charge level for the high charge rate. If yes, the charge status circuit 44 communicates to the function controller 42 that the rechargeable device 46 has met the predetermined charge level for the high charge rate. The function controller 42 then communicates to the charge mode circuit 48 to begin charging the rechargeable device 46 at the low charge rate (e.g. less than 100 ma). The function controller 42 can also reconfigure the USB Function device 40 to be a low power bus powered device by communicating this to the USB host computer 30. In step 110, the charge status circuit 44 monitors the rechargeable device 46 to determine if the device has met a predetermined charge level for the low charge rate. If no, step 100 and 110 are repeated until the rechargeable device 46 reaches the predetermined charge level for the low charge rate. If yes, the charge status circuit 44 communicates to the function controller 42 that the rechargeable device 46 has met the predetermined charge level for the low charge rate, and the function controller 42 communicates to the charge mode circuit 48 to stop charging the rechargeable device 46, in step 120. In step 130, the charge mode status circuit 44 monitors the rechargeable device 46 to determine if it is below a predetermined charge level for driving the high powered peripheral device 50. If no, the charge mode status circuit 44 continues monitoring. If yes, the routine returns to step 90 for recharging the recharging device 46 at the high charge rate. It should be noted that the predetermined charge level for driving the high powered peripheral device 50 could be directly monitored by the high powered peripheral device 50 and communicated to the controller 42 by the peripheral device 50 itself, when the predetermined charge level is too low to drive the peripheral device 50.

Figure 2B:
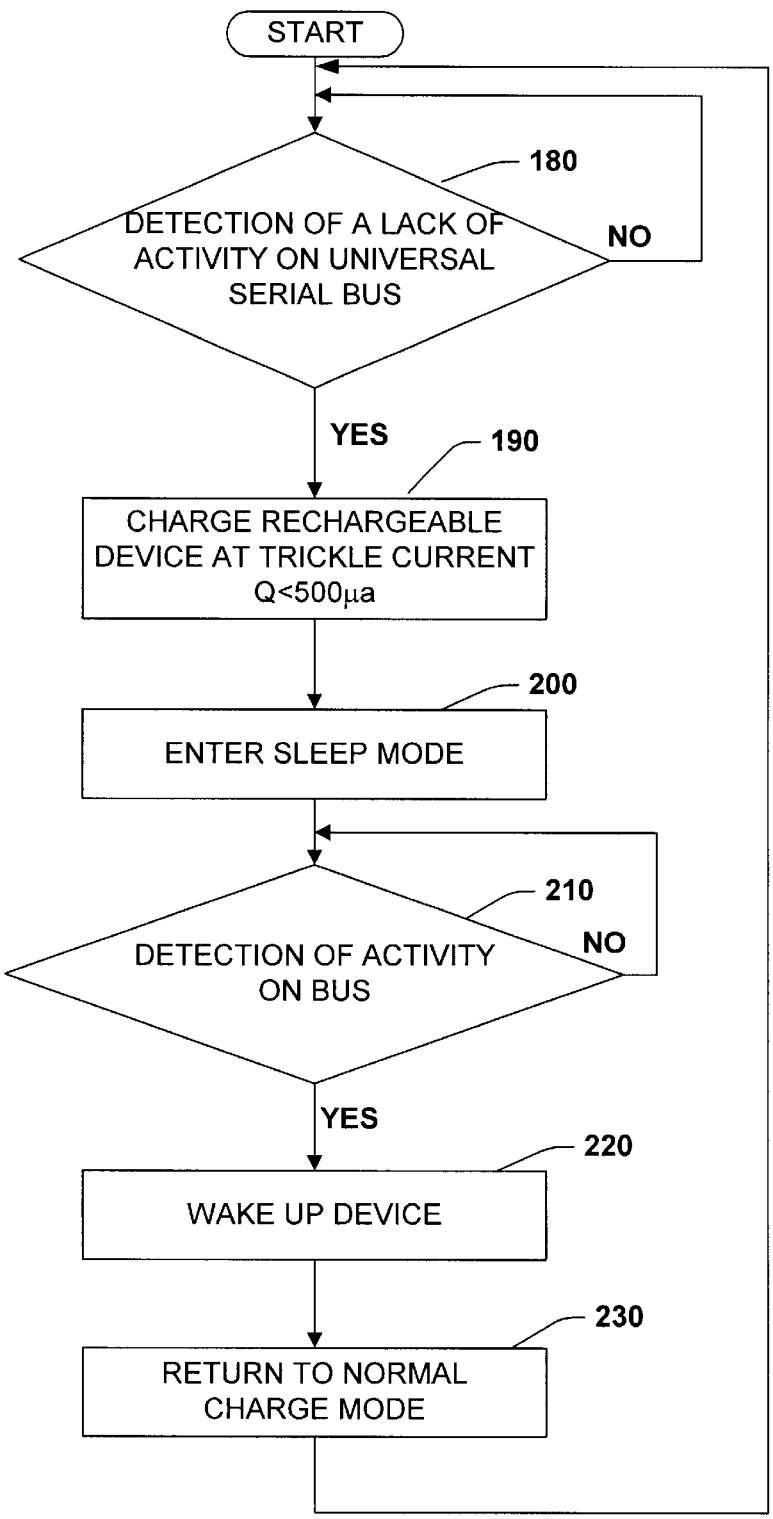
FIG. 2b illustrates a flow diagram for detecting a lack of activity on the Universal Serial Bus and charging the rechargeable device of FIG. 1 at a trickle charge rate in accordance with of the present invention.
Figure 2C:
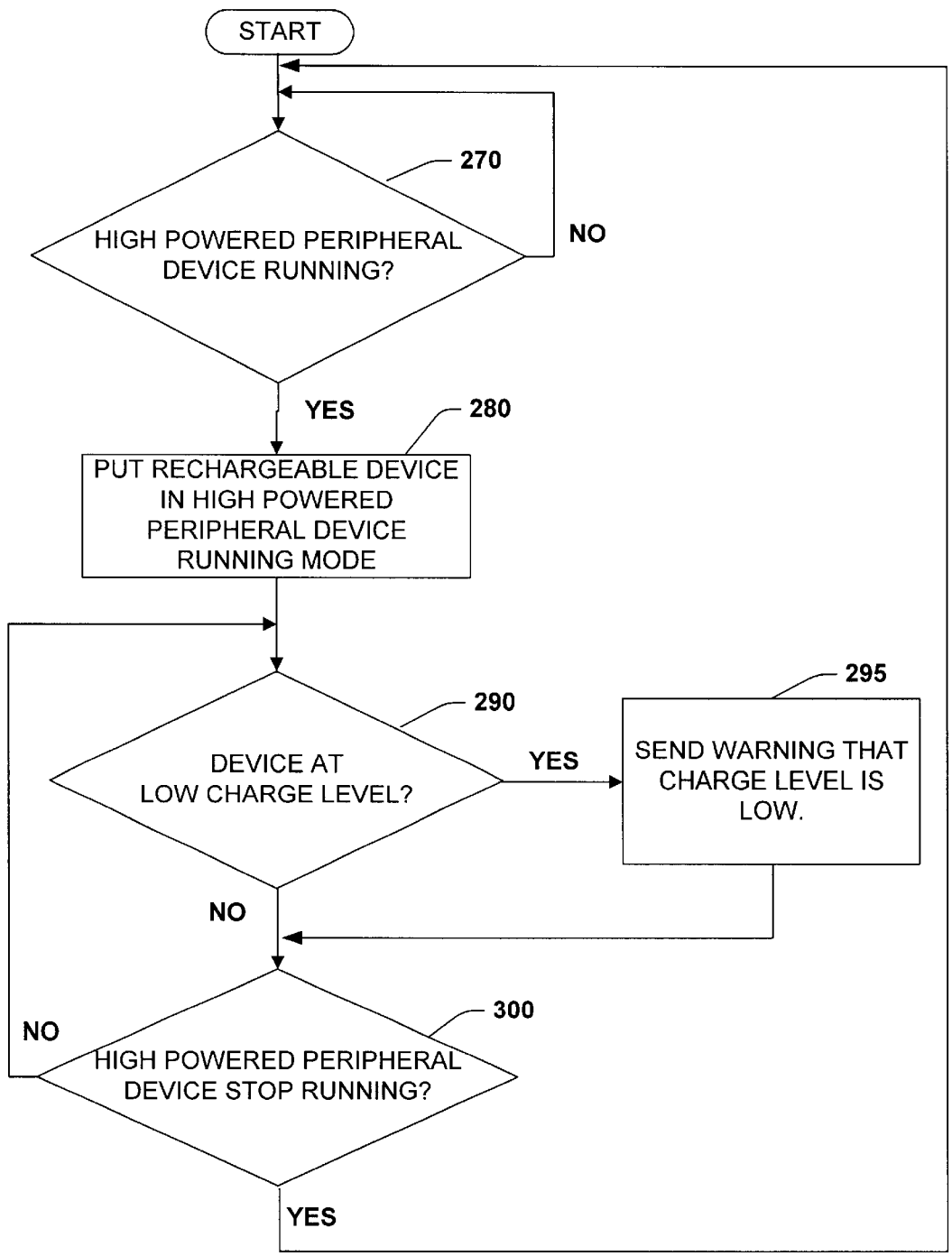
FIG. 2c illustrates a flow diagram for detecting the operation of a high powered peripheral device being driven by the rechargeable device of FIG. 1 in accordance with one aspect of the present invention.

Referring now to FIG. 2b illustrating a process run by the function controller 42 for monitoring whether or not the USB host computer enters the sleep or suspend mode. This process runs simultaneously with the routine describe in FIG. 2a. In step 180, the function controller checks to see if there is a lack of activity on the USB. If no, the function controller 42 continues monitoring the USB for lack of activity. If yes, the function controller 42 communicates to the charge mode circuit 48 to begin charging the rechargeable device 46 at a trickle charge rate, which is less than 500 μa, in step 190. The function controller 42 then communicates to the device 40 to enter the sleep or suspend mode, in step 200, were the function device 40 draws minimal current from the USB Vbus. It should be appreciated that the rechargeable device 46 could be driving the high powered peripheral device 50 during the sleep or suspend mode, but the rechargeable device 46 and the remaining circuitry should not draw any more than 500 μa of current. However, it is preferable that running high powered peripheral device 50 causes a resume command to be sent to the host computer 30 from the USB function device 40, so that the host computer 30 resumes normal operation allowing the rechargeable device 46 to charge at the high charge rate. The function controller then waits for activity from the USB in step 210. If activity is detected, the function controller wakes up the device 40, in step 220, and returns to the normal charge mode in step 230, as illustrated in FIG. 2a. The current process returns to step 180 to wait for no activity on the USB again. FIG. 2c illustrates a process for monitoring high powered peripheral device 50. The process may be running simultaneously with the process illustrated in FIG. 2b and the routine illustrated in FIG. 2a. The process of FIG. 2c determines whether or not the high powered peripheral device 50 is running, in step 270. If no, the process repeats step 270. If yes, the process advances to step 280 were the rechargeable device 46 is placed in the high powered peripheral device running mode. In accordance with one aspect of the invention, the function controller 42 places the rechargeable device 46 in the high powered peripheral device running mode by signaling the charge mode circuit 48 to discontinue charging of rechargeable device 46. In another aspect of the invention, the function controller 42 places the rechargeable device 46 in the high powered peripheral device running mode by signaling the charge mode circuit 48 and the host computer 30 to charge the rechargeable device 46 at the high charge rate. After placing the rechargeable device 46 in the high powered peripheral device running mode, the process determines whether or not the rechargeable device is at a low charge level, in step 290. If yes, the function controller 42 sends a warning signal to the host computer 30 that the charge level is low, and then proceeds to step 300. If no, the process advances to step 300 without the warning, and determines if the high powered peripheral device 50 has stopped running. If no, the process returns to step 290. If yes, the process returns to step 270 to monitor whether or not the high powered peripheral device 50 is running.

Figure 3:
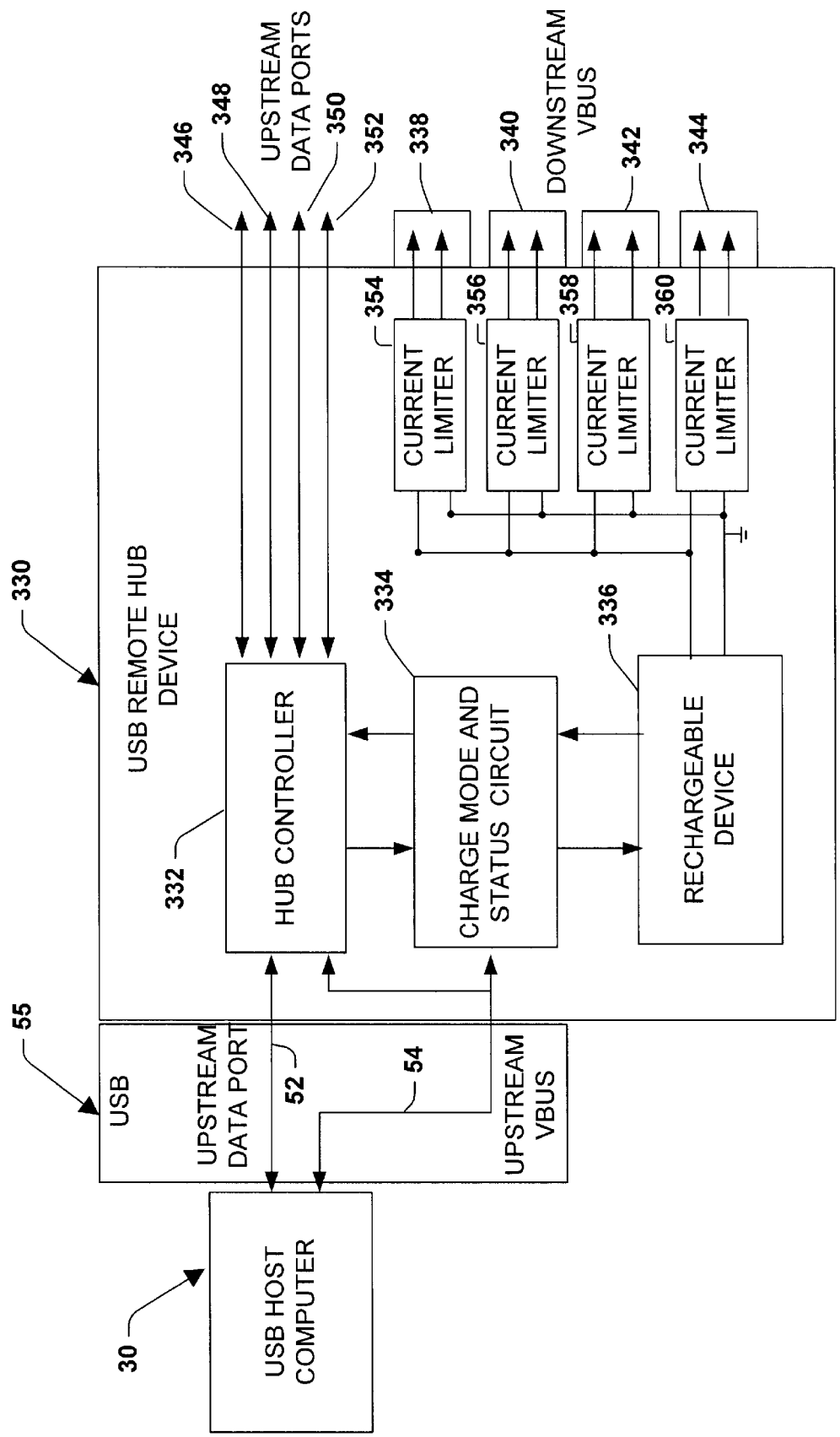
FIG. 3 illustrates a block diagram of a Universal Serial Bus remote hub device including a rechargeable device coupled to a host computer in accordance with one aspect of the present invention.

It should be appreciated that the present invention is not limited to USB function devices as explained above. For example, FIG. 3 illustrates a USB remote hub device 330 coupled to the USB host computer 30 by the upstream data port 52 and the upstream Voltage Bus (VBus) 54 of the typical USB communications port 55. The USB remote hub device 330 includes a hub controller 332 powered by the VBus 54 and connected to the upstream data port 52. The hub controller 332 communicates bidirectionally with a charge mode and status system 334. The charge mode and status system 334 is coupled to a rechargeable device 336, which could be a battery or a large capacitor that acts as an energy well for storing current. The rechargeable device 336 provides power to a downstream high powered peripheral device (not shown), such as a zip drive or a radio, via a first power port 338 through current limiter 354, a second power port 340 through current limiter 356, a third power port 342 through current limiter 358 and a fourth power port 344 through current limiter 360. It should be appreciated that due to certain current limitations imposed by the USB specification, it may be necessary to daisy chain one or more of the power ports 338, 340, 342 and 344 to provide enough power for a single high powered peripheral device The hub controller 332 communicates with the downstream high powered peripheral device via a first data port 346, a second data port 348, a third. data port 350 and a fourth data port 352. The hub controller 332 communicates with the host 30 to tell the host 30 that the USB remote hub device 330 is ready to operate. The host computer 30 then provides current via the VBus to the charge mode and status circuit 334, which determines the amount of current provided to the rechargeable device 336. The charge mode and status system 334 includes discrete status and charge mode sub-systems to monitor the rechargeable device 336, and change the recharging mode from a high charge rate to a low charge rate and any other necessary current charging rate configurations. The charge mode and status system 334 can provide charge mode and rechargeable device status information to the hub controller 332 via bidirectional communication. The hub controller 332 could receive status information from the charge mode and status system 334 informing the hub controller 332 when the rechargeable device 336 has been charged to a predetermined threshold, or has fallen below a predetermined charge level for running the high powered peripheral device (not shown). It should be noted that the routines and processes described in FIGS. 2a–c for the USB function device 40 could be utilized by the USB remote hub device 330. For example, the USB remote hub device 330 could be configured as a high power bus powered device and draw up to 500 ma of current in a high charge rate. The USB remote hub 330 could be configured as a low power bus powered device and draw up to 100ma of current in a low charge rate mode. Furthermore, the USB remote hub 330 will enter the sleep mode and draw less than 500 ma of current like the USB function device 40. Furthermore, the process for monitoring the bus in FIG. 2b and monitoring whether the high powered peripheral device is running or not in FIG. 2c is applicable to use with a remote hub device 330.

Figure 4:
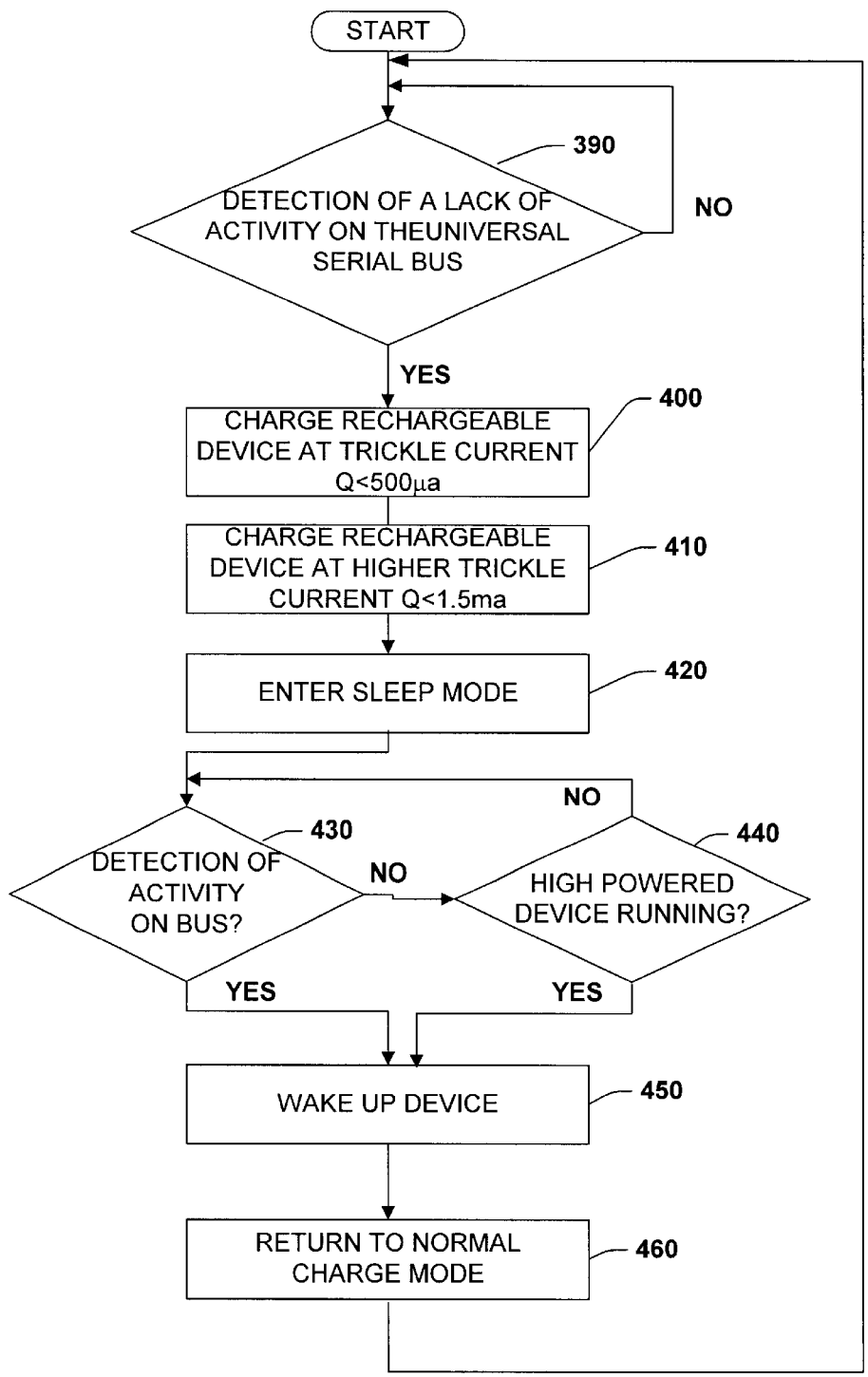
FIG. 4 illustrates a flow diagram for employing remote wake up capability of the device of FIG. 3 when detecting the operation of a high powered peripheral device in accordance with one aspect of the present invention.

FIG. 4 illustrates the USB remote hub device 330 employing remote wake up capabilities. Although the remote wake up capabilities will be explained with reference to the USB remote hub device 330, it should be appreciated that the USB function device 40 could be configured with remote wake up capabilities and will operate essential the same. FIG. 4 is a flow diagram illustrating the USB remote hub device 330 wherein the operation of a high powered device causes the USB remote hub device 330 to send a remote wake up to the host computer 30. In step 390, the hub controller 332 continuously checks to determine if there is a lack of activity on the USB. If no, the process continues monitoring the USB for lack of activity. If yes, the hub controller 332 communicates to the charge mode status system 334 to begin charging the rechargeable device 336 at a trickle charge rate, which is less than 500 μa, in step 400. Since the USB remote hub device 330 is then configured to operate with remote wake up capability, the hub controller 332 signals the charge mode and status system 334 to charge rechargeable device at a higher trickle charge rate that is less than 1.5 ma, including the current necessary for the remote wake up functionality. The hub controller 332 then communicates to the device 330 to enter the sleep or suspend mode in step 420, were it draws minimal current from the USB Vbus. The hub controller 332 then waits for activity from the USB, in step 430. If activity is detected, the hub controller 332 wakes up the device 330, in step 450, and returns to the normal charge mode, in step 460. The current process returns to step 180 to wait for activity on the USB again. If step 430 is no, the process determines if the high powered device is running, in step 440. If no, the process returns to step 430 and then 440 in a continuous loop. If yes, meaning the high powered peripheral device is running, a remote wake up is initiated by hub controller 332, which first wakes up the USB remote hub device 330 and then sends a remote wake up to the USB host computer 30. The process then returns to the normal charge mode in step 460, and returns to step 390 to wait for no activity on the USB again.

The invention has been described with reference to the preferred embodiments. Obviously, modifications and alterations will occur to others upon reading and understanding the preceding detailed description. It is intended that the invention be construed as including all such modifications alterations, and equivalents thereof.

What is claimed is:

1. A remote function device coupleable to a host computer through a Universal Serial Bus port, comprising;
   a function controller coupleable to the host computer;
   a mode and status system coupled to the function controller; and
   a rechargeable device coupled to the mode and status system and a peripheral device, the rechargeable device adapted to drive the peripheral device, wherein the rechargeable device draws current from the Universal Serial Bus to charge the rechargeable device to a predetermined level for driving the peripheral device, the predetermined charge level exceeding a charge level that can be provided by the Universal Serial Bus directly.

2. The device of claim 1, wherein the rechageable device draws current at a low charge rate during power up and then is reconfigured to draw current at a high charge rate after power up.

3. The device of claim 1, wherein the rechargeable device draws current at a high charge rate until the rechargeable device reaches a predetermined charge level for the high rate wherein the rechargeable device draws current at a low charge rate.

4. The device of claim 3, wherein the rechargeable device stops charging at the low charge rate upon reaching a predetermined charge level for the low charge rate.

5. The device of claim 4, wherein the current drawn by the rechargeable device at the high charge rate is greater than 100 milliamps and less than 500 milliamps.

6. The device of claim 1, wherein the mode and status system is discrete system that operates to monitor the charge level of the rechargeable device and operates to alternate the charging mode of the rechargeable device in response to different charge levels of the rechargeable device.

7. The device of claim 1, wherein the mode and status system includes a status system that monitors the charge level of the rechargeable device and provides this information to the function controller and a mode system which is controlled by the function controller and operates to charge the charging mode of the rechargeable device.

8. The device of claim 1, wherein the device is configured with remote wake up capabilities.

9. The device of claim 8, wherein the device wakes up from a suspended state and sends a remote wake up signal to the host computer when the high powered peripheral device draws current from the rechargeable device.

10. The device of claim 1, wherein the rechargeable device is a battery.

11. A remote hub device coupleable to a host computer through a Universal Serial Bus port, comprising;
   a hub controller coupleable to the host computer;
   a mode and status system coupled to the hub controller; and
   a rechargeable device coupled to the mode and status system and adapted to provide current to at least four power ports, each port limiting the current, wherein the rechargeable device draws current from the Universal Serial Bus to charge the rechargeable device to a predetermined level for providing the current to the at least four power ports.

12. The device of claim 11, wherein the rechargeable device draws current at a low charge rate during power up and then is reconfigured to draw current at a high charge rate after power up.

13. The device of claim 11, wherein the rechargeable device draws current at a high charge rate until the rechargeable device reaches a predetermined charge level for the high charge rate wherein the rechargeable device draws current at a low charge rate.

14. The device of claim 13, wherein the rechargeable device stops charging at the low charge rate upon reaching a predetermined charge level for the low charge rate.

15. The device of claim 14, wherein the current drawn by the rechargeable device at the high charge rate is greater than 100 milliamps and less than 500 milliamps.

16. The device of claim 11, wherein the mode and status system is a discrete system that operates to monitor the charge level of the rechargeable device and operates to alternate the charging mode of the rechargeable device in response to different charge levels of the rechargeable device.

17. The device of claim 11, wherein the mode and status system includes a status system that monitors the charge level of the rechargeable device and provides this information to the hub controller and a mode system which is controlled by the hub controller and operates to change the charging mode of the rechargeable device.

18. The device of claim 11, wherein the device is configured with remote wake up capabilities.

19. The device of claim 18, wherein the device wakes up from a suspended state and sends a remote wake up signal to the host computer when the high powered peripheral device draws current from the rechargeable device.

20. The device of claim 11, wherein the rechargeable device is a battery.

21. A method of charging a rechargeable device on a Universal Serial Bus device coupled to a host computer comprising the steps of;
   initializing the Universal Serial Bus device in a low charge rate;
   configuring the Universal Serial Bus device to operate in a high power bus powered mode; and
   charging the rechargeable device at a high charge rate until the rechargeable device reaches a predetermined charge level for the high charge rate; and
   charging the device at a low charge rate until the rechargeable device reaches a predetermined charge level for the low charge rate.

22. The method of claim 21, further including the step of monitoring the rechargeable device after the step of charging the device at a low charge rate to determined if the rechargeable device falls below a predetermined charge level for driving a high powered peripheral device.

23. The method of claim 22, further including the step of charging the rechargeable device at a high charge rate until the rechargeable device reaches a predetermined charge level for the high charge rate, if the rechargeable device falls below the predetermined charge level for driving the high pow peripheral device.

24. The method of claim 21, further including the step of monitoring the Universal Serial Bus for lack of activity and charging the rechargeable device at a trickle charge rate upon detection of no activity on the Universal Serial Bus for a predetermined amount of time.

25. The method of claim 24, further including the step of configuring the Universal Serial Bus device as a remote wake up device and configuring the device to operate in a high trickle charge mode for charging the rechargeable device at a high trickle charge rate upon detection of no activity on the Universal Serial Bus for a predetermined amount of time.

26. The method of claim 25, further including the step of monitoring a high powered peripheral device driven by the rechargeable device to determine if the high powered peripheral device is running, and waking up the Universal Serial Bus device upon detection that the high powered peripheral device is running.

27. The method of claim 21, further including the step of monitoring a high powered peripheral device driven by the rechargeable device to determine if the high powered device is running and putting the rechargeable device in the high powered peripheral device running mode if the high powered peripheral device is running.

28. The method of claim 27, further including the step of monitoring the charge level of the rechargeable device to determine if the charge level is low for driving the high powered peripheral device and sending a warning signal to the host computer if the charge level is low for driving the high powered peripheral device.

29. A remote Universal Serial Bus device coupleable to a host computer through a Universal Serial Bus port, comprising,
   means for powering a high powered peripheral device, the means for powering the high powered peripheral device being rechargeable and connected to the high powered peripheral device;
   means for monitoring the charge level of the means for powering the high powered peripheral device;
   means for changing the charge level of the means for powering the high powered peripheral device; and
   means for controlling the configuration of the Universal Serial Bus device which communicates this to the remote host computer wherein the means for controlling the configuration of the Universal Serial Bus device configures the Universal Serial Bus device as a high power bus powered device after power up.

30. The device of claim 29, wherein the means for monitoring determines when the means for powering the high powered peripheral device reaches a predetermined charge level for a high charge rate wherein the means for changing the charge level of the means for powering the high powered peripheral device changes the charge level of the means for powering to a low charge rate.

31. A remote function device coupleable to a host computer through a Universal Serial Bus port, comprising;

a function controller coupleable to the host computer;

a mode and status system coupled to the function controller; and a rechargeable device coupled to the mode and status system and adapted to drive a high powered function device wherein the rechargeable device draws more than 100 ma and less than 500 ma of current from the Universal Serial Bus to charge the rechargeable device to a predetermined charge level for a high charge rate, then the rechargeable device draws less than 100 ma until the rechargeable device reaches a predetermined charge level for a low charge rate wherein the rechargeable device stops charging at the low charge rate upon reaching the predetermined charge level for the low charge rate.

32. The device of claim 31, wherein the mode and status system operates to monitor the charge level of the rechargeable device and operates to alternate the charging mode of the rechargeable device in response to different charge levels of the rechargeable device.

33. The device of claim 31, wherein the mode and status system monitors the charge level of the rechargeable device and provides this information to the function controller.

34. The device of claim 31, wherein the device is configured with remote wake up capabilities.

35. The device of claim 34, wherein the device wakes up from a suspended state and sends a remote wake up signal to the host computer when the high powered peripheral device draws current from the rechargeable device.

36. The device of claim 31, wherein the rechargeable device is a battery.

\* \* \* \* \*

UNITED STATES PATENT AND TRADEMARK OFFICE
CERTIFICATE OF CORRECTION

PATENT NO. : 6,665,801 B1 Page 1 of 1
DATED : December 16, 2003
INVENTOR(S) : Paul B. Yanchus III It is certified that error appears in the above-identified patent and that said Letters Patent is hereby corrected as shown below:

Column 1,
Line 39, "exteral" should be -- external --.

Column 3,
Line 65, "recharge" should be -- rechargeable --.

Column 10,
Line 51, "rechageable" should be -- rechargeable --.

Column 11,
Line 8, "charge" should be -- change --.

Column 12,
Line 21, "pow" should be -- powered --.

Signed and Sealed this

Twenty-third Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,665,801 B1
DATED : December 16, 2003
INVENTOR(S) : Martin M. Weiss It is certified that error appears in the above-identified patent and that said Letters Patent is hereby corrected as shown below:

Column 1,
Line 39, "exteral" should be -- external --.

Column 3,
Line 65, "recharge" should be -- rechargeable --.

Column 10,
Line 51, "rechageable" should be -- rechargeable --.

Column 11,
Line 8, "charge" should be -- change --.

Column 12,
Line 21, "pow" should be -- powered --.

This certificate supersedes Certificate of Correction issued March 23, 2004.

Signed and Sealed this

Twentieth Day of July, 2004

JON W. DUDAS
*Acting Director of the United States Patent and Trademark Office*